(12) United States Patent
Cavarec et al.

(10) Patent No.: US 10,345,776 B2
(45) Date of Patent: Jul. 9, 2019

(54) METHOD FOR CONTROLLING AND/OR MONITORING AT LEAST ONE ACTUATOR

(71) Applicant: SOMFY SAS, Cluses (FR)

(72) Inventors: Pierre Emmanuel Cavarec, Mont Saxonnex (FR); Fabien Rousseau, Mieussy (FR)

(73) Assignee: SOMFY SAS, Cluses (FR)

( * ) Notice: Subject to any disclaimer, the term of this patent is extended or adjusted under 35 U.S.C. 154(b) by 0 days.

(21) Appl. No.: 15/306,695

(22) PCT Filed: Apr. 16, 2015

(86) PCT No.: PCT/FR2015/051029
§ 371 (c)(1),
(2) Date: Oct. 25, 2016

(87) PCT Pub. No.: WO2015/162359
PCT Pub. Date: Oct. 29, 2015

(65) Prior Publication Data
US 2017/0045868 A1 Feb. 16, 2017

(30) Foreign Application Priority Data
Apr. 25, 2014 (FR) ...................................... 14 53729

(51) Int. Cl.
*F24F 11/30* (2018.01)
*F24F 11/70* (2018.01)
(Continued)

(52) U.S. Cl.
CPC ............ *G05B 19/042* (2013.01); *F24F 11/30* (2018.01); *F24F 11/70* (2018.01); *G05B 15/02* (2013.01);
(Continued)

(58) Field of Classification Search
CPC .................. G05B 19/042; G05B 15/02; G05B 2219/2642; G05B 2219/2614;
(Continued)

(56) References Cited

U.S. PATENT DOCUMENTS 6,604,023 B1    8/2003   Brown et al.
8,086,352 B1 *  12/2011  Elliott .................. F24F 11/0009
                                                        700/275

(Continued)

OTHER PUBLICATIONS

International Search Report dated Jul. 15, 2015 re: Application No. PCT/FR2015/051029; pp. 1-2; citing: US 2004/267385 A1, US 8 086 352 B1 and US 6 604 023 B1.

*Primary Examiner* — Ziaul Karim
(74) *Attorney, Agent, or Firm* — Cantor Colburn LLP (57) ABSTRACT

A method for controlling and/or monitoring at least one actuator of a visual or thermal comfort device in a building, includes the steps of: collecting data from a plurality of control points configured to send at least one control order to at least one actuator, the data including, for at least each control point, information relating to an instantaneous measurement value of a physical quantity relating to comfort or to the energy consumption in the building. The measurement value is determined at the location of the control point. The method further includes the step of exploiting the data, wherein the exploitation includes the definition of at least one correspondence between an instantaneous measurement value of a physical quantity and a spatial location of the measurement of the physical quantity in the building.

11 Claims, 3 Drawing Sheets (51) Int. Cl.
*G05B 15/02* (2006.01)
*F24F 110/50* (2018.01)
*F24F 110/64* (2018.01)
*F24F 140/60* (2018.01)
*G05B 19/042* (2006.01)

(52) U.S. Cl.
CPC ....... *F24F 2110/50* (2018.01); *F24F 2110/64* (2018.01); *F24F 2140/60* (2018.01); *G05B 2219/2614* (2013.01); *G05B 2219/2642* (2013.01)

(58) Field of Classification Search
CPC ............... F24F 11/0017; F24F 11/0076; F24F 2011/0023; F24F 2011/0047; Y02B 30/78
USPC .................................................. 700/275–287
See application file for complete search history.

(56) References Cited

U.S. PATENT DOCUMENTS

| | | | |
|---|---|---|---|
| 9,423,172 B2* | 8/2016 | Wong | G05B 15/02 |
| 2004/0267385 A1* | 12/2004 | Lingemann | G05B 15/02 |
| | | | 700/83 |
| 2014/0129161 A1* | 5/2014 | Sons | G06Q 50/06 |
| | | | 702/61 |

* cited by examiner

METHOD FOR CONTROLLING AND/OR MONITORING AT LEAST ONE ACTUATOR

TECHNICAL FIELD

The present disclosure concerns a system and a method for commanding and/or controlling at least one actuator.

BACKGROUND

It is known to provide a system for commanding actuators of a building comprising a central command entity and communicating with the actuators according to a known wireless communication protocol, in particular a radio-frequency communication protocol.

For example, the actuators comprise an electric motor arranged for opening and closing a shutter or a window. Each actuator is also arranged so as to operate independently from the others, for example when it is piloted by a local remote control.

It is also known to collect measured values of physical quantities of the building, in particular the temperature, the hygrometric degree or the luminosity, the acoustics. To do so, a set of sensors of physical quantities related to the internal comfort and to the energy consumption are installed in the building. These sensors are judiciously placed in the building so as to measure, as accurately as possible, the considered physical quantity. Afterwards, the sensors may pilot the actuators locally or communicate their measurements to the central command entity using the wireless communication protocol.

This system gives satisfaction to the extent that the accurate knowledge of measured values of physical quantities of the building is allowed by the sensors.

Nonetheless, in a building, the specificity of each room, in particular its use, its orientation, requires a multitude of sensors distributed in each room. Besides, it is necessary that the sensors are accurate and properly installed in the room (for example, a sensor of the internal temperature, installed on a wall exposed to the Sun throughout the day, will give only but an inaccurate measurement of the internal temperature in the room). Thus, the set-up of the system may turn out to be complicated and expensive.

The present disclosure aims to solve all or part of the aforementioned drawbacks.

SUMMARY

To this end, the present disclosure concerns a method for commanding and/or controlling at least one actuator of an equipment for visual or thermal comfort of a building, including the following steps:
  collecting data from a plurality of command points arranged so as to emit at least one command order towards at least one actuator, the data comprising at least for each command point a piece of information on an instantaneous value of a measurement of a physical quantity related to the comfort or to the energy consumption in a building, the determination of said measured value being carried out at the location of the command point,
  carrying out an exploitation of the data, the exploitation comprising the definition of at least one correspondence between an instantaneous value of a measurement of a physical quantity and a spatial localization of the measurement of said physical quantity in the building.

In the present text, the expression «command point» is equivalent to «command unit»: It includes a physical entity.

Thanks to the arrangements according to the disclosure, it becomes possible to have, easily and at a lower cost, measurements of physical quantities related to the comfort or to the energy consumption of the building in a plurality of places and to create a network of measuring points without adding new elements, by collecting the data from the command points.

According to one aspect of the disclosure, at least one command point comprises a measuring point arranged so as to measure the instantaneous value of the corresponding physical quantity.

In practice, a sensor is integrated to the command point. Thus, it is not necessary to proceed to the installation of a stock of additional sensors distributed in the building arranged for the collection of the data.

Thus, for example, the collection of data and its exploitation allows supplying a representation of measured values to a user or still obtaining an indication regarding the effect of a command of an actuator on its immediate environment in the building, characterized by at least one physical quantity.

According to one aspect of the disclosure, at least one global quantity of the building related to comfort or to energy consumption is determined from the collected data.

Preferably, the global quantity is an average quantity such as an average temperature of the interior of the building or a total quantity such as the total acoustic power in the building.

According to one aspect of the disclosure, at least one local quantity related to a portion of the building, such as a portion of a room, a room or a set of adjacent rooms, is determined from the collected data.

In other terms, the at least one local quantity is obtained by carrying out a correlation of several data derived from several command points. For example, one of these command points may have an integrated sensor arranged so as to carry out an instantaneous measurement of a temperature.

This arrangement allows taking into account all the instantaneous values of the measurements and their associated spatial localizations to determine, during the data exploitation step, at least one local quantity presenting an accuracy higher than the accuracy of each instantaneous measurement considered individually.

According to one aspect of the disclosure, a comparison is carried out between a value of a local quantity related to said portion of the building and a value of a global quantity of the building.

According to one example, it is possible to determine the arrival of persons in a room if the temperature sensors of this room indicate that the temperature rises while the temperature remains stable in the other rooms of the building.

According to one aspect of the disclosure, a variation of a measured value of a physical quantity of a first type is associated to a variation of a measured value of a physical quantity of a second type and the occurrence of an event is determined from said variations.

From measured values such as a temperature and a hygrometric degree related to the same room, it is thus possible to determine a particular event, such as an ironing session in a chamber resulting in a punctual rise of the temperature and in an increase of the hygrometric degree. The detection of a simultaneous increase of these two parameters, without any impact on the other rooms, is characteristic of a particular event proper to the room, namely an ironing session in the example.

In this case, the aberrant character of the measurement corresponds to a punctual event which does not require any particular reaction.

According to one aspect of the disclosure, the exploitation of the data comprises an application of a thermal and/or aeraulic model to the collected data for the determination of an estimate of an evolution of at least one physical quantity of the building. Preferably, the application of said aeraulic model allows determining the air flows entering and re-circulating according to a defined air quality.

According to one aspect of the disclosure, at least one command order of at least one actuator of the plurality of actuators is established from the collected data. This operation is carried out by the central command entity.

Thus, it is possible to determine one or several command order(s) of at least one equipment for visual or thermal comfort of the building based on the collected data constituting a mapping of the building so that the central command entity could manage comfort and energy consumption in a global manner.

Each actuator is capable of operating independently because it is commanded by an associated command point. The method aims to induce coherence between the local and global values as well as the mapping of the building and the states of the actuators.

Command scenarios may be established by taking into account, at the same time, local measurements in the area of the actuator, in other areas and/or general data regarding the building.

According to one aspect of the disclosure, the collected data further comprise at least one piece of information on a state or on a position of use of an actuator coming from said actuator.

This arrangement brings additional pieces of information for the exploitation of the collected data. In particular, besides the indication on the effect of a command order on at least one physical quantity, it is possible to know the impact of the state or of the position of use on at least one physical quantity.

According to one aspect of the disclosure, at least one group corresponding to a logical localization in the same portion of a room of the building or in a set of adjacent rooms is determined, the group comprising command points and actuators associated to said command points.

According to one aspect of the disclosure, the determination of the local quantity is carried out while taking into account the pieces of information on the instantaneous values of the measurements coming from the command point(s) of the group.

According to one aspect of the disclosure, several instantaneous measurements of a physical quantity of the same type are collected simultaneously, it is thus possible to compensate the inaccuracy of some measurements thanks to the other measurements.

According to one aspect of the disclosure, the exploitation of the data also comprises the identification of an aberrant character of a measured value in comparison with the other measured values.

The determination of the aberrant character allows not attaching too much importance to the corresponding measured value. Preferably, the aberrant character is determined in comparison with an average of measured values of the physical quantity of the same type from other command points and/or in comparison with an average evolution of said other measured values of the same type.

When it comes to values of the same type, for example temperatures, the aberrant character of a measured value may result from an improper spatial arrangement of the sensor. According to one example, it may include a temperature sensor exposed to the Sun and which then measures a temperature higher than that of the room in which it is installed.

According to one aspect of the disclosure, the command and/or control method comprises a step of identifying at least one association of an actuator to a command point.

The association (pairing) between the command point and the actuator exists on a local level. The identification of the association has to be made by the central command entity.

This arrangement allows the central command entity to localize the command point, and in particular the provenance of measurement data of a physical quantity supplied by this command point, by associating it with a given actuator without the need for additional data on the location of the command point to the extent that the actuator is spatially spotted.

This arrangement allows the central command entity to identify an association in a simple way, for example when the command point is a bidirectional remote control.

According to one aspect of the disclosure, the identification of the association of an actuator to a command point is carried out by using a piece of information received from the actuator on the command point with which it is associated, said piece of information being comprised in the collected data. The data are collected by the central command entity.

According to one aspect of the disclosure, the identification of the association of an actuator to a command point is carried out by examining the correspondence of a command order emitted from said command point and a response of an actuator, coherent with said emitted command order. The response includes a change of the state or of the position of use of the actuator.

This arrangement allows noticing, when a command order from a command point is emitted and a position of use or a state of an actuator is then modified, that this actuator and this command order are associated. Thus, the central command entity can associate an actuator and a command point in the case of a command point constituted, for example, by a unidirectional remote control.

According to one aspect of the disclosure, a user command is entered at the level of a command point, the command point generating a command order of the actuator associated to said command point based on the user command.

Each actuator can be commanded by a user from the associated command point independently from the execution of the steps of the method.

According to one aspect of the disclosure, the collected data further comprise the command order.

Not only the user is capable of modifying the state or the position of use of an actuator via the command point but this piece of information is further used by the system which includes this piece of information in the data.

Several architectures are possible for the management of the data. According to one aspect of the disclosure, the command order is emitted by the command point and is included in the collected data.

According to one aspect of the disclosure, the central command entity then determines an adapted command order to be transmitted to one or several actuator(s).

According to one aspect of the disclosure, the adapted command order further comprises a piece of information on the preponderant character of the adapted command order with respect to the command order emitted by the command point.

The adaptation of a command order or of a command counterorder aims to make the state or the position of the considered actuator coherent with respect to the states or positions of use of the other actuators of the building.

Thus, aberrant command orders derived by a command point, such as opening a window and increasing the heating at the same time, may be countered or adapted by the method for the sake of the comfort of the user in the building or for optimizing the energy consumption of the building.

Nonetheless, it is still possible to define as preponderant the user command and thus dispense with a counterorder. This includes a forced command of an actuator.

According to one aspect of the disclosure, the central command entity is capable of determining whether a modification on a command order derived by a command point is necessary.

The present disclosure also concerns a computer program product comprising program code portions for the execution of the steps of the method described hereinabove.

The present disclosure further concerns a system for commanding and/or controlling at least one actuator comprising:
- a plurality of actuators, each actuator being arranged so as to pilot an equipment of a building, such as a shutter, a heater, an air-conditioning apparatus, a lamp or a loudspeaker,
- a plurality of command points, each actuator being associated to a command point arranged so as, on the one hand, to transmit at least one command order to said actuator and, on the other hand, to acquire an instantaneous value of a measurement of a physical quantity,
- a central command entity provided with a processor arranged so as to contain and execute the computer program product, the central command entity being arranged so as to collect data from the command points according to a wireless communication protocol and to exploit said data.

According to one aspect of the disclosure, the central command entity further comprises a user interface arranged for the display of the collected data. Thus, the user can check the instantaneous values of the measurements from the command points of the building.

According to one aspect of the disclosure, at least one command point comprises a sensor, the sensor being arranged so as to measure a physical quantity.

BRIEF DESCRIPTION OF THE DRAWINGS

Anyway, the disclosure will be better understood from the description which follows, made with reference to the appended schematic drawings representing, as a non-limiting example, an embodiment of this method and of this system.

DETAILED DESCRIPTION OF THE DRAWINGS

Figure 1:
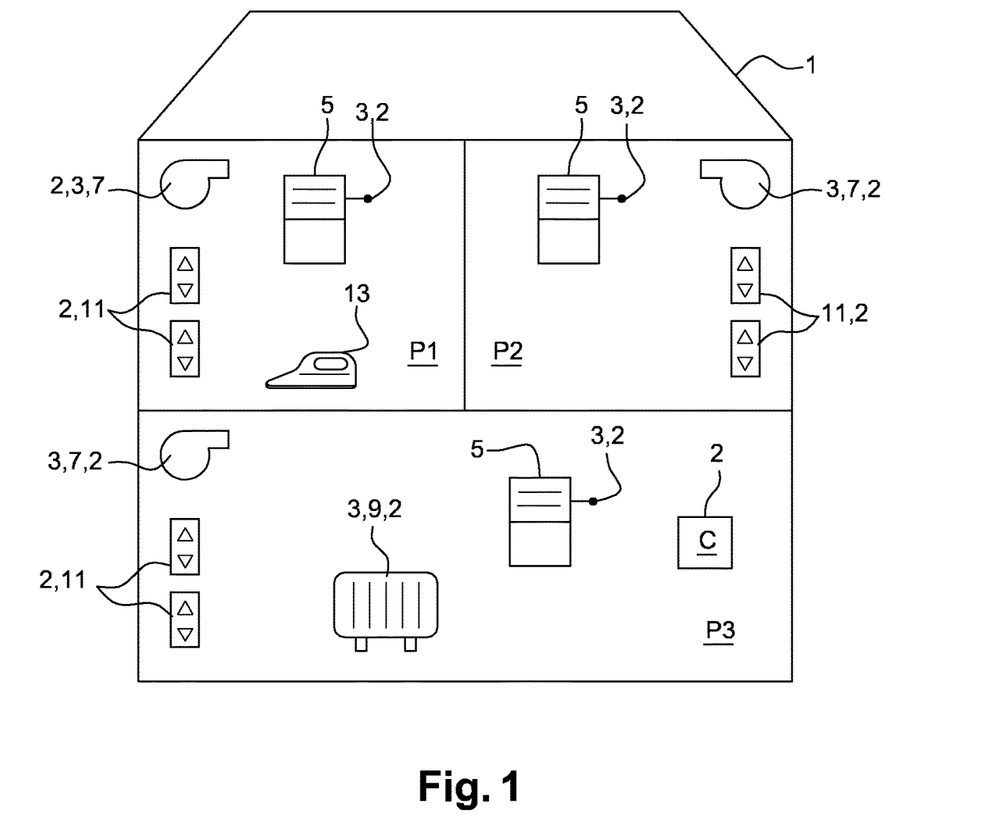
FIG. 1 is a schematic of a building comprising a system for commanding and/or controlling actuators.

As illustrated in FIG. 1, a building 1 comprises several rooms P1, P2, P3 and a system 2 for commanding and/or controlling a plurality of actuators 3.

In the present text, the term actuator 3 refers to a device allowing acting, electrically and/or mechanically, on an equipment of a building, such as a shutter, a heater, a light fixture, an air-conditioning apparatus in order to modify its state. The actuator comprises a command receiver allowing it to receive an automatic or manual command order, for example, derived from a sensor or a from a user command.

According to one example, an actuator may comprise an electric motor arranged for opening and closing a movable equipment 5 of the building such as a shutter or a window, the command order corresponding to a position of use of said shutter or said window.

According to another example, an actuator 3 may comprise an aeraulic apparatus 7.

Similarly, an actuator may comprise an electric motor, a pneumatic or hydraulic cylinder, a heating resistor or a heater 9, a lamp or an electromagnet.

The command and/or control system 2 also comprises a plurality of command points 11. Each command point 11 is arranged so as to emit a command order towards at least one actuator 3 subsequently to an action of the user on the command point or subsequently to the detection of a passage through a predetermined threshold of a physical quantity measured by the command point.

A command order corresponds to an operation setpoint of said actuator 3. The actuator associated to the command point from which the command order comes and receiving this command order reacts by modifying its state or its position of use.

Thus, it turns out that an actuator 3 and a command point 11, associated to each other, are capable of operating independently from the other actuators 3 and possibly from the command and/or control system 2. In particular, the command point 11 may comprise a user interface, symbolized herein by triangles, so that a user could enter his user commands on the command point 11 in order to elaborate the command order accordingly.

In the presented embodiment, each command point 11 comprises at least one integrated sensor serving as a measuring point. The sensor is located in a casing of the command point. Depending on the type of sensor, the casing may comprise an opening facing the sensor so as to facilitate the measurement.

In the present text, the term sensor refers to a device for measuring a physical quantity, for example a quantity related to a surrounding physical parameter. The sensor comprises or cooperates with a command emitter allowing it to transmit an exploitable value derived from the measurement.

As example, the physical quantities related to comfort or to energy consumption may be a quantity related to the quality of air (pollutant, smoke, rate of CO in the air, etc.), to an internal temperature of the building, a hygrometric degree, a quantity related to the luminosity, to the spectral distribution of light, to the presence of individuals in the building, a quantity related to the sound level, to the spectral distribution of noise, to the infrared thermal emissions, to the infrasonic vibrations, to the velocity of air streams (captured for example by a hot-wire probe).

The sensors used in the presented embodiment comprises humidity degree and temperature sensors comprised in the command points of an aeraulic apparatus 7 and luminosity degree sensors comprised in the command points of electric shutters.

The sensor 3 of a command point 11 has a first local function: the measured value is used by the command point to elaborate a command order towards the actuator with which it is associated. A command order may also come from the user interface of the command point. In order to elaborate the command order corresponding to the user command or to the measurement of the sensor, each command point comprises a microcontroller. The integrated sensor is also connected to the microcontroller. Thus, it is possible to share, between the sensor and the command point, part of the components, such as the microcontroller or a radio-frequency transmitter.

The sensor 3 of a command point 11 has a second general function: the measured value is supplied to a central command entity.

The command and/or control system further comprises a central command entity C comprising a treatment device provided with a processor arranged so as to command and/or control the plurality of actuators 3 according to a method described hereinafter. The central command entity C also comprises a user interface arranged so that a user could command and/or control the system as explained hereinafter. The central command entity also comprises an emitter-receiver device.

The central command entity C is arranged so as to communicate with actuators 3 and command points 11 according to a wireless communication protocol commonly used for this type of apparatuses, in particular a radio-frequency protocol.

The first step E1 for commanding and/or controlling actuators includes collecting data from command points 11.

Figure 2:
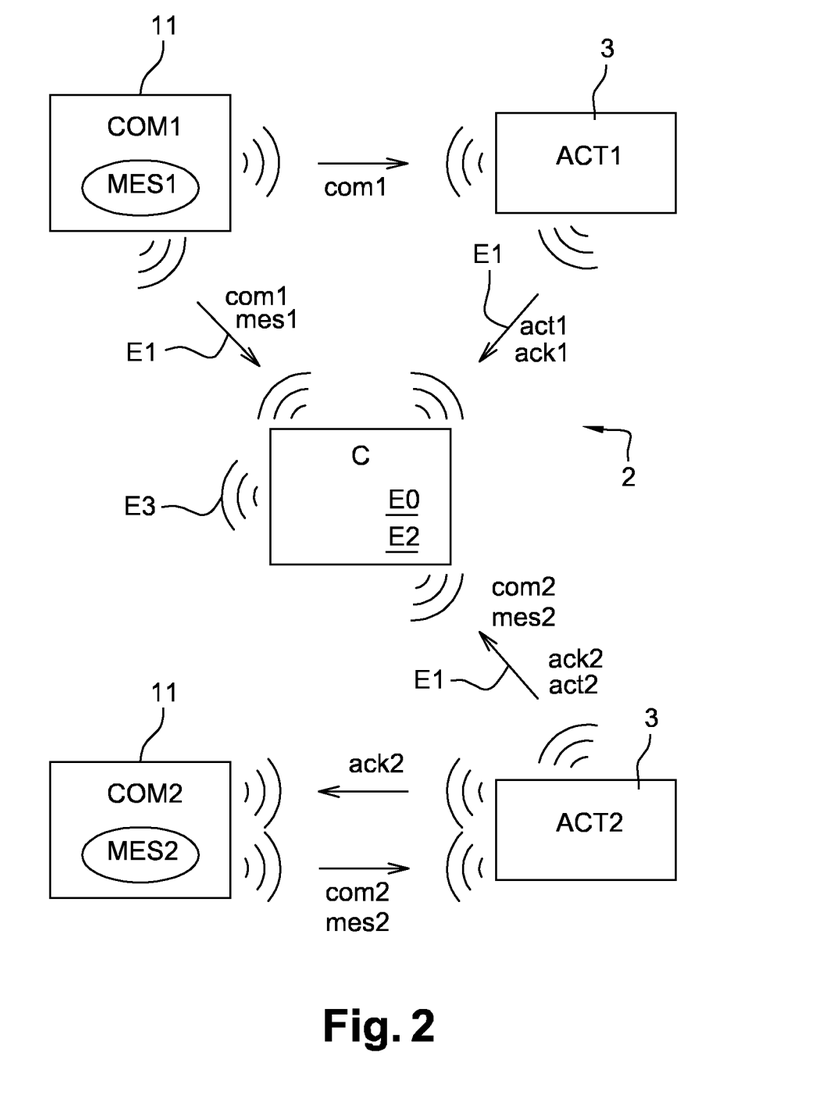
FIG. 2 is a view of a system for commanding and/or controlling actuators.

As illustrated in FIG. 2, an actuator ACT1 is arranged so as to receive a command order com1 from a command point COM1 comprising a sensor MES1 according to the wireless communication protocol symbolized by an arrow.

The same applies to the actuator ACT2 with the command order com2 from the command point COM2.

The central command entity C is arranged so as to store a piece of information on a location act1 of the actuator ACT1 and on a location act2 of the actuator ACT2. This piece of information is generally entered manually by the user or by an installer during the configuration of the command and/or control system, at installation or emitted by the actuator ACT1, respectively the actuator ACT2, according to the wireless communication protocol if these actuators are provided with this piece of information, as illustrated in FIG. 2. This piece of information is not intended to be modified over time.

The sensor MES1 is arranged so as to measure an instantaneous value of a physical quantity, for example a temperature. The command point COM1 is arranged so as to emit said instantaneous value mes1. This value may be emitted alone or in a frame together with a command order com1 towards the actuator ACT1. For example, the instantaneous value mes1 measured by the sensor MES1 is a relative humidity. The same applies to the sensor MES2, respectively.

The actuator ACT2 is also arranged so as to receive the pieces of information com2 and mes2 from the command point COM2. The command point COM2 is bidirectional: it is further capable, in particular subsequently to the sending of a command order com2, of receiving a confirmation ack2 of the receive of the message mes2 by the actuator ACT2 and/or of the execution of the command order by the actuator ACT2.

This arrangement allows the command point COM2, when it operates independently from the system, to control or display that the actuator ACT2 has actually reached the setpoint position defined by the command order com2.

As described hereinbefore and illustrated in FIG. 2, the first step E1 comprises, for the central command entity C, a step of collecting the pieces of information com1, mes1, com2, mes2, and possibly ack1, ack2, from the command points COM1 and COM2 and the actuators ACT1, ACT2.

Figure 3:
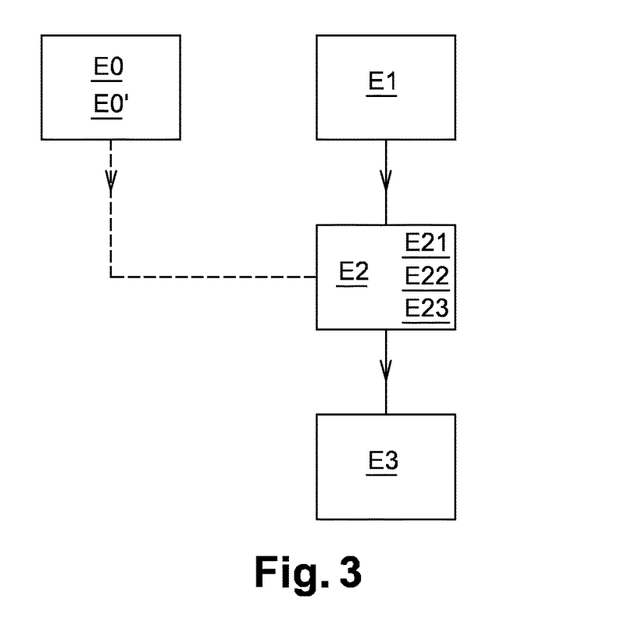
FIG. 3 is a flow chart of the steps of a method for commanding and/or controlling actuators.

As described in FIG. 3, a step E0, which may be executed independently from the first step E1, comprises associating the command points to the actuators. This association, also called pairing, comprises in particular exchanging at least one identifier characterizing the actuator and/or the command point and allowing creating privileged links between the command points and the actuators. Thus, upon completion of pairing, the command orders derived from the command point COM1 will be taken into account only by the actuator ACT1 with which it has been paired.

This step may be carried out only once, this being symbolized by the dashed line in FIG. 3. Thus, once this step E0 has been carried out, and as long as no new actuator or new command point has been added to the command and/or control system, it is not necessary to carry it out again.

It is then necessary to the central command entity to identify these pairings or associations, during a step E0'. To this end, the processor of the central command entity C is arranged so as to record the correspondence between the actuators and the command points.

There are several possibilities for the central command entity to carry out the identification of the associations between actuators and command points.

In particular, in a command and/or control system where the different elements are bidirectional, it is possible for a user to proceed manually, via the user interface of the central command entity, by associating the discovered actuators and command points.

By discovery, is meant that the command points and the actuators exchange data, in particular pairing data, according to the wireless communication protocol with the central command entity C, in particular on request of the latter.

In the case of a system where part of the command points are unidirectional (for example, in this instance, the command point COM1), the command point COM1 cannot receive a confirmation message ack1 from the actuator ACT1.

In order to identify the association between the command point COM1 and the actuator ACT1, the central command entity is arranged so as to recognize a command order derived from a command point and to recognize a confirmation ack1 of an actuator, that is to say a confirmation of receive of a command order or a confirmation of a change of state or position, subsequent to a command order. The command point having emitted the command order is then considered as associated with the actuator having confirmed the order.

In this instance, the central command entity C is arranged so as to notice that a change of state or position due to an actuator ACT1 is subsequent to a command order com1 and to deduce that the command point COM1 and the actuator ACT1 are associated.

The second step E2 includes exploiting data collected during the first step E1, the steps E0 and E0' also being carried out before this second step E2, as illustrated in FIG. 3.

The exploitation involves carrying out a merger of the collected data mes1, and mes2, possibly as well as com1 and com2, ack1 and ack2, that is to say carrying out a pooling of these data, at the level of the central command entity C, as detailed hereinafter.

The exploitation of the collected data in a centralized way allows supplying a graph of correspondence or a mapping of the physical quantities measured in the building.

Thus, it is possible to differentiate the general phenomena regarding the entire building 1 from the particular events applying only to a portion of the building 1. This mapping also allows linking measured values to conditions of use of the rooms of the building.

Advantageously, the second step E2 may comprise a substep E21 of grouping the actuators 3 and the command points 11 belonging to the same portion of the building.

For example, a group of actuators and command points comprises all the command points with sensors and all the actuators comprised in the same room: thus, the physical quantities measured in this room being linked to the locations of the actuators, will be treated in a common manner for commanding the actuators of the room: it is thus possible to determine a local quantity for this group of actuators and hence for this room. For example, if the actuators ACT1 and ACT2 are in the same room, it will be possible to exploit the measurement mes1 derived from the first command point COM1 to command (via the central command entity) the actuator ACT2, even though the command point COM1 is not paired to the actuator ACT2.

According to another aspect of the disclosure, the second step E2 also comprises an operation of determining an aberrant character of a measured value in comparison with the other measured values.

Figure 4:
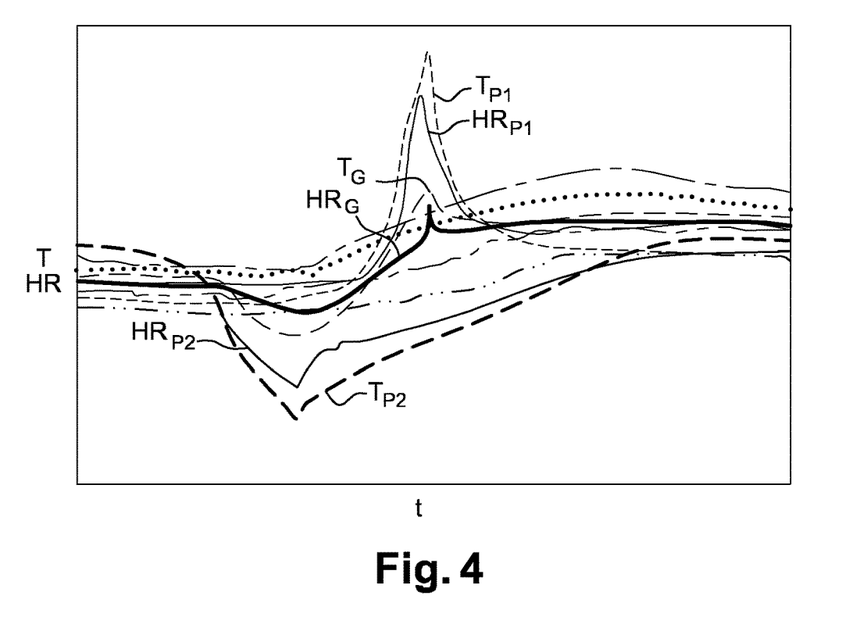
FIG. 4 is a graph representing the evolution of relative humidity and temperature in the rooms of the building as a function of time.

Thus, as illustrated in FIG. 4, there is represented the evolution, for the building 1, of the internal temperature T of the rooms and the relative humidity RH as a function of time t.

There are represented two global quantities which are the average value of the temperature $T_G$ in the building 1 and the average relative humidity $RH_G$. The quantities described hereinafter are local quantities related to the rooms P1 and P2 of the building.

For a particular room P2, it appears that the relative humidity $RH_{P2}$ (as well as the internal temperature $T_{P2}$) decreases punctually and then rises again. This measurement, at first glance aberrant because not related to any other variation in the building, corresponds to a particular event: the opening of a window. To the extent that this drop of temperature is noticed as very localized (the other measurements available at other locations in the building not showing this inflection), the central command entity will keep guard of starting the heating in order to compensate the local drop of temperature.

In the same vein, a rise of the internal temperature $T_{P1}$ and a simultaneous increase of the relative humidity $RH_{P1}$ are observed, simultaneously for another room P1. This corresponds to a particular event: a laundry ironing session symbolized in FIG. 1 by an iron 13.

It is to be noted that in the case of these events, the command points of the room comprising the sensor of the internal temperature $T_{P1}$, respectively $T_{P2}$, and the sensor of the relative humidity degree $RH_{P1}$, respectively $RH_{P2}$, belong to the same group. Indeed, one single event affects both of them.

Thus, the particular event of the ironing session or of the opening of a window has been identified. It lasts for a shorter duration than a general evolution tendency of a physical quantity related to a surrounding physical parameter.

When an event such as an ironing session has been identified once, the central command entity is capable of recognizing another event of the same type.

Another operation carried out during the second step includes comparing the measured values of physical quantities of the same type, such as the temperature, in order to determine whether a sensor is accurate or whether a sensor measures a wrong or inaccurate value.

For example, if a command point fitted with a temperature sensor is durably exposed to the Sun and provides a value substantially higher than those of the other command points in the same room or in other rooms, the central command entity is capable of determining it.

The central command entity is also arranged so as to keep in memory on its processor the anterior measured values and to deduce average values and an expected average evolution. The average values may correspond to an average value of a physical quantity in the building considered as a whole, for a room or a group of sensors: a so-called global quantity is thus determined.

Thus, thanks to the arrangements of the disclosure, it is possible to improve the reliability of the measured values, distinguish the general tendencies of evolution of the physical quantities and recognize punctual events.

The second step E2 further comprises a substep E22 of forming the data for display and direct communication to the user of the pieces of information determined by the exploitation of the data via the user interface of the central command entity C. To do so, the central command entity C comprises for example a screen.

The second step E2 further comprises a substep E23 of determining scenarios for piloting the actuators 3.

Indeed, based on the local data comprised in memory, the central command entity is capable of determining whether a modification on a local command order is necessary.

For example, a calculation model implemented by the processor may allow determining how to regulate the air flow of the aeraulic apparatus 7 in the rooms and even determining how to improve the quality of air by acting on the command orders to the actuators.

A third step E3, subsequent to the second step E2, includes applying a pilot scenario determined during the substep E23 of the second step E2.

For example, a user remarks that the temperature is high in the room after the ironing session, as mentioned above and visible in FIG. 4.

He can then emit a command order via the command point of the aeraulic system 7 in order to make the latter feed the room with fresh air. This command order may also take place automatically, via the temperature sensor in the room.

As detailed above, this command order is captured by the central command entity during the first step E1, and then exploited during the second step E2.

Having determined during the second step E2 that the rise of the temperature is related to a particular local event, the processor also determines that, when the event will cease, the temperature will return to a normal value.

Thus, the command order of the user appears to the central command entity as barely adapted to the situation. The third step E3 then includes generating a command counterorder by transmitting this counterorder to the considered command point or directly to the aeraulic actuator 7 using the wireless communication protocol, as illustrated in FIG. 2.

In the present case, this counterorder may correspond to a moderation of the arrival of fresh air. Thus, it is possible to avoid a drop of temperature in the room, subsequently to the ironing session, because of a too considerable renewal of air.

It is also possible, according to a setting of the central command entity 3, to implement the application of the scenario according to the third step E3 only when the command order derived from step E2 is an automatic order. Thus, a command order derived from an action of the user remains paramount.

Thus, according to this setting, the user can increase the arrival of fresh air without the central command entity 3 emitting a command counterorder.

Thus, the presented method allows for a flexibility of use. The command points 11 comprising sensors are used to pilot the equipments of the building and, at the same time, to carry out measurements of physical quantities. Thus, the set-up of the command and/or control system 2 turns out to be simple and inexpensive. The interest is to create a network of sensors in the building, without the user having to add new elements, since the sensors are integrated to the command points. In particular, the method according to the disclosure is very advantageous for renovation works, since it is then possible to enhance the features of the system, without investing in accurate and expensive sensors, and without any installation overhead. Besides, the inaccuracy of the measuring sensors integrated to the command points is compensated thanks to the meshing of the different measurements in the building. Thus, the command and/or control system is made more reliable.

Indeed, an integrated sensor has a first function of being used locally to pilot an actuator independently, and a second function of transmitting its measurements to the central command entity.

Other independent sensors may also be added to the system if they are capable of transmitting data according to the wireless communication protocol.

It goes without saying that the disclosure is not limited to the sole embodiment of this method, described hereinabove as example, but it encompasses on the contrary all variants thereof.

The invention claimed is:

1. A method for commanding and/or controlling at least one actuator of an equipment for visual or thermal comfort of a building, the method including the following steps:
   collecting data from a plurality of command points, which are local remote control, arranged so as to emit at least one command order towards at least one actuator, the data comprising at least for each command point a piece of information on an instantaneous value of a measurement of a physical quantity related to the comfort or to the energy consumption in a building, the measurement of said measured value being carried out at the location of the command point and associated to a spatial localization, and carrying out an exploitation of the data, the exploitation comprising the definition of at least one correspondence between an instantaneous value of a measurement of a physical quantity and a spatial localization of the measurement of said physical quantity in the building, and
   wherein at least one global quantity of the building related to comfort or to energy consumption is determined from the collected data from the plurality of command points, the at least one global quantity being an average quantity determined from the collected data from the plurality of command points,
   wherein at least one local quantity related to a portion of the building is determined from the collected data from the plurality of command points, the at least one local quantity being obtained by carrying out a correlation of several data derived from several command points,
   wherein a comparison is carried out between a value of a local quantity, said local quantity being locally collected in a same special localization by the command point and being related to said portion of the building and a value of a global quantity of the building,
   wherein average values are deduced from anterior measured values, and
   wherein average values correspond to an average value of a physical quantity in the building considered as a whole, for a room or a group of sensors, a global quantity is determined,
   wherein at least one command order of at least one actuator of the plurality of actuators is established from the collected data.

2. The method for commanding and/or controlling at least one actuator according to any claim 1, wherein a variation of a measured value of a physical quantity of a first type is associated to a variation of a measured value of a physical quantity of a second type and the occurrence of an event is determined from said variations.

3. The method for commanding and/or controlling at least one actuator according to claim 1, wherein the collected data further comprise at least one piece of information on a state or on a position of use of an actuator coming from said actuator.

4. The method for commanding and/or controlling at least one actuator according to claim 1, wherein at least one group corresponding to a logical localization in the same portion of a room of the building or in a set of adjacent rooms is determined, the group comprising command points and actuators associated to said command points.

5. The method for commanding and/or controlling at least one actuator according to claim 4, wherein the determination of the local quantity is carried out while taking into account the pieces of information on the instantaneous values of the measurements coming from the command point(s) of the group.

6. The method for commanding and/or controlling at least one actuator according to claim 1, comprising a step of identifying at least one association of an actuator to a command point.

7. The method for commanding and/or controlling at least one actuator according to claim 6, wherein the identification of the association of an actuator to a command point is carried out by using a piece of information received from the actuator on the command point with which it is associated, said piece of information being comprised in the collected data.

8. The method for commanding and/or controlling at least one actuator according to claim 6, wherein the identification of the association of an actuator to a command point is carried out by examining the correspondence of a command order emitted from said command point and a response of an actuator coherent with said emitted command order.

9. A non-transitory computer readable program product comprising program code portions for the execution of the steps of a method according to claim 1.

10. A system for commanding and/or controlling at least one actuator comprising:
    a plurality of actuators, each actuator being arranged so as to pilot an equipment of a building,
    a plurality of command points, each actuator being associated to a command point arranged so as, on the one hand, to transmit at least one command order to said actuator and, on the other hand, to acquire an instantaneous value of a measurement of a physical quantity, and
    a central command entity provided with a processor arranged so as to contain and execute a non-transitory computer readable program product comprising program code portions for the execution of the steps of a method, the central command entity being arranged so as to collect data from the command points according to a wireless communication protocol and to exploit said data, wherein the method includes the following steps:

collecting data from the plurality of command points, the data comprising at least for each command point a piece of information on an instantaneous value of a measurement of a physical quantity related to the comfort or to the energy consumption in a building, the measurement of said measured value being carried out at the location of the command point and associated to a spatial localization, and carrying out an exploitation of the data, the exploitation comprising the definition of at least one correspondence between an instantaneous value of a measurement of a physical quantity and a spatial localization of the measurement of said physical quantity in the building, and wherein at least one global quantity of the building related to comfort or to energy consumption is determined from the collected data from the plurality of command points, the at least one global quantity being an average quantity determined from the collected data from the plurality of command points, wherein at least one local quantity related to a portion of the building is determined from the collected data from the plurality of command points, the at least one local quantity being obtained by carrying out a correlation of several data derived from several command points, wherein a comparison is carried out between a value of a local quantity, said local quantity being locally collected in a same special localization by the command point and being related to said portion of the building and a value of a global quantity of the building, wherein average values are deduced from anterior measured values, and wherein average values correspond to an average value of a physical quantity in the building considered as a whole, for a room or a group of sensors, a global quantity is determined.

11. The system for commanding and/or controlling at least one actuator according to claim 10, wherein at least one command point comprises a sensor, the sensor being arranged so as to measure a physical quantity.

* * * * *